United States Patent [19]

Browning et al.

[11] Patent Number: 5,778,590
[45] Date of Patent: Jul. 14, 1998

[54] FIREARM COVER

[76] Inventors: David Preston Browning, 270 Charter Oaks Dr., Canyon Lake, Tex. 78133; Edward Wiley Martin, HC 3, Box 22, New Braunfels, Tex. 78132-2201

[21] Appl. No.: 584,206

[22] Filed: Jan. 4, 1996

[51] Int. Cl.[6] .................... F41A 35/02; B32B 7/06
[52] U.S. Cl. .................. 42/96; 428/919; 428/352
[58] Field of Search .................. 42/96; 428/919, 428/914, 352, 354, 42.1, 41.7

[56] References Cited

U.S. PATENT DOCUMENTS

| Re. 32,752 | 9/1988 | Kiang. | |
|---|---|---|---|
| D. 301,804 | 6/1989 | McIlhinney. | |
| 4,409,287 | 10/1983 | Harrison | 428/343 |
| 4,433,500 | 2/1984 | Kunevicius. | |
| 4,743,509 | 5/1988 | Kokrhanek | 428/425.1 |
| 4,837,056 | 6/1989 | Easley. | |
| 4,865,900 | 9/1989 | Shannon et al.. | |
| 4,868,019 | 9/1989 | Knickerbockner. | |
| 4,981,737 | 1/1991 | Rico | 428/40 |
| 5,066,529 | 11/1991 | Huber et al. | 428/40 |
| 5,254,661 | 10/1993 | Wilson | 428/57 |

OTHER PUBLICATIONS

FLEXcon Product Data Sheet for CONFORMcal V-400-PSW V-29 PFW, Nov. 1996.

*Primary Examiner*—Michael J. Carone
*Assistant Examiner*—Christopher K. Montgomery
*Attorney, Agent, or Firm*—Stephen R. Greiner

[57] ABSTRACT

A protective cover for a long-barreled firearm having a stock with opposed sides. The cover includes a thin, vinyl sheet bearing a camouflage design and having a shape corresponding to that of one side of the stock. A backing of light-tack, adhesive material is preferably applied to the undersurface of the vinyl sheet to permit such to be selectively positioned on the stock.

11 Claims, 1 Drawing Sheet

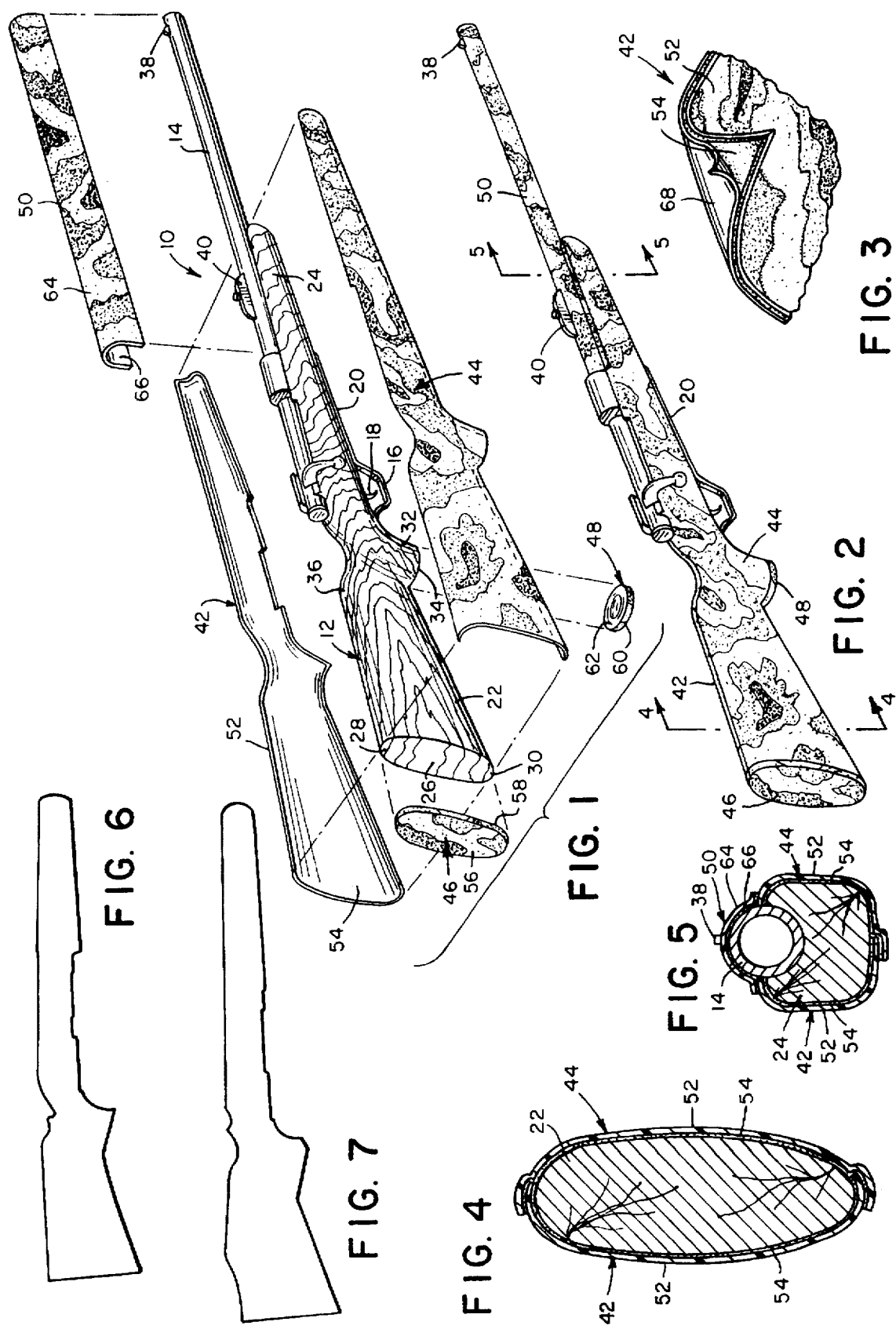

FIREARM COVER

FIELD OF THE INVENTION

The present invention relates generally to firearm stocks and, more particularly, to a protective cover therefor.

BACKGROUND OF THE INVENTION

To enhance market share, firearm manufacturers often lavish attention on the external appearance of their products. For example, in the manufacture of rifles and shotguns, choice hardwoods, like mahogany and walnut are frequently formed into gun stocks. Prior to finishing, it is not unusual for these stocks to be provided with added surface features in the form of carved decorations and checkering. Similarly, gun barrels and other exposed metal parts are painstakingly smoothed, polished and blued to provide surfaces pleasing to the eye. These operations increase production costs while at the same time yielding products that are relatively fragile and susceptible to damage in the outdoors.

Typical long-barreled firearms are simply not scrape, scuff or scratch-resistant. When inadvertently struck against brush, rocks, wire fences and the like, abrasions on the exterior surface of a given firearm will occur and accumulate. Over time, the physical appearance of the firearm may deteriorate to the point where costly refinishing is required.

Of course, most firearms are resistant to neither bright light nor moisture. As is well known, finishes applied to wooden stocks are susceptible to cracking and fading when exposed to bright sunlight for prolonged periods. Water brought into contact with metal gun parts, on the other hand, can cause tarnishing and rusting of their surfaces. Thus, it may be in a shooter's best interest to cover his or her firearm while moving through any outdoor environment.

Gun gloves have been proposed to remedy some of the problems noted above. These gloves typically include one or more flexible bodies which can be separately secured by zippers or other means to the forearm and butt portions of a stock for protective purposes. As a group, however, the prior art gloves are complex in their construction, cumbersome to use, and not moisture resistant.

SUMMARY OF THE INVENTION

In light of the deficiencies presented by the gun gloves currently available in the marketplace, it is the principal object of the invention to provide a cover which may be quickly and easily secured to any long-barreled firearm to protect both its metallic and wooden components from scrapes, scuffs, scratches, moisture and sunlight.

It is a further object of the invention to provide a cover of the type described which may be selectively secured to a firearm by means of an adhesive backing which is non-damaging to firearm surfaces.

It is another object of the invention to provide a firearm cover that will enclose substantially all of a firearm in a photo-realistic, camouflage pattern simulative of a woodland, savannah, dessert or any other selected environment to match the surroundings in which the firearm is used.

It is an additional object of the invention to provide a firearm cover that requires a minimum of storage space and requires no elaborate structure for storage prior to use. Thus, a shooter may carry one or more covers in a pocket so that change-outs may be easily accomplished when entering varied habitats or environments.

It is an object of the invention to provide improved elements and arrangements thereof in a cover for the purposes described which is lightweight, inexpensive, dependable and fully effective in accomplishing its intended purposes.

Briefly, the protective cover in accordance with this invention achieves the intended objects by featuring one or more thin, vinyl sheets bearing a camouflage design and having a shape corresponding to that of one portion of a firearm. A backing of light-tack, adhesive material is preferably applied to the undersurface of the vinyl sheets to permit such to be selectively positioned on the stock or other firearm surface. When used, not only is the exterior of the firearm protected from damage but every light reflective area thereof (butt, forearm and barrel) is durably camouflaged to eliminate the risk of glare.

The foregoing and other objects, features and advantages of the present invention will become readily apparent upon further review of the following detailed description of the preferred embodiments as illustrated in the accompanying drawings.

BRIEF DESCRIPTION OF THE DRAWINGS

The present invention may be more readily described with reference to the accompanying drawings, in which:

FIG. 1 is an exploded, perspective view of a firearm cover assembly in accordance with the presented invention oriented for positioning on a rifle.

FIG. 2 is a perspective view of the rifle of FIG. 1 bearing the cover assembly.

FIG. 3 is a perspective view showing a protective release liner being removed from one of the cover portions.

FIG. 4 is a cross-sectional view taken along line 4—4 of FIG. 2.

FIG. 5 is a cross-sectional view taken along line 5—5 of FIG. 2.

FIG. 6 is a plan view of the preferred lateral stock portion.

FIG. 7 is a plan view of a modified form of the lateral stock portion.

Similar reference characters denote corresponding features consistently throughout the accompanying drawings.

DETAILED DESCRIPTION OF THE PREFERRED EMBODIMENTS

With reference to FIG. 1, there is illustrated a long-barreled firearm in the form of a rifle 10 preferably having a wooden stock 12 and a metallic gun barrel 14 carried atop the stock. Projecting from the bottom of the stock 12 is trigger guard 16, within which is accommodated a trigger 18, and a conventional magazine floor plate 20.

The stock 12 includes integral, butt and forearm portions 22 and 24. At its rear, the butt portion 22 is provided with a butt plate 26 having a heel 28 and a toe 30. At its forward end, on the other hand, the butt portion 22 includes a relatively narrow, pistol-grip 32 with a stock grip cap 34 covering its lower end. An elevated comb 36 is provided between the forward and rear ends of the butt portion 22 for comfort in handling the rifle 10.

The gun barrel 14 comprises an elongated tube positioned on the forearm portion 24 of the stock 12. As shown, the barrel 14 includes a front sight 38 mounted on the free end thereof. A rear sight 40 is mounted on the barrel 12 at a predetermined distance from front sight 38.

In accordance with the invention, the rifle stock 12 and barrel 14 are blanketed by a multi-part cover which renders such resistant to scratches and the effects of inclement weather. As shown, the preferred cover comprises: a pair of lateral stock portions 42 and 44, a butt plate portion 46, a grip cap portion 48 and a barrel portion 50. During use, each of the portions 42–50 is conformed to the outer, wooden and metallic surfaces of the rifle 10 and conveniently bonded thereto.

The lateral portions 42 and 44, having mirror-image outlines, preferably comprise thin, vinyl sheets 52 shaped to sheath one side of the stock 12. As shown in FIGS. 3 and 4, however, the lateral portions 42 and 44 are slightly "oversized" so that their peripheral edges overlap one another to ensure a water-resistant seal. To secure the lateral portions 42 and 44 in place, each is provided with an adhesive backing 54 coextensive with the underside of the sheet 52 which may include any one of a variety of known, light-tack or permanent adhesives.

Similarly, the butt plate portion 46 comprises a thin vinyl sheet 56 having an oval shape corresponding with that of the butt plate 26. The underside of the sheet 56 is provided with a light-tack adhesive backing 58 for fastening to the butt plate 26. In the preferred embodiment, the size of the butt plate portion 46 is sufficiently large so that it will slightly overlap the lateral portions 42 and 44 for a water-resistant seal.

Like the butt plate portion 46, the grip cap portion 48 comprises a thin, vinyl sheet 60 having an oval shape corresponding with that of the grip cap 34. A light-tack adhesive backing 62 is provided to the underside of the sheet 60 for fastening to the grip cap 34.

The barrel portion 50 preferably comprises a sheet of vinyl 64 having a light-tack adhesive backing 66 on its underside. The elongated, rectangular configuration of the portion 50, permits it to be readily fastened to, and around, the gun barrel 14. If desired, openings may be provided in the portion 50 by a user to closely accommodate the front and rear sights 38 and 40. In the alternative, the portion 50 may be stretched or folded directly over the sights to cover them. Obtaining an accurate aim with the sights 38 and 40 covered by portion 50 may be difficult, however. Thus, this latter practice is not specifically recommended.

The outer surface of each vinyl sheet 52, 56, 60 and 64 is preferably provided with a camouflage design simulating the natural environmental conditions in which the rifle 10 is to be used. The camouflage design may be accomplished in color or black and white. If a colored design is selected, however, the colors should be capable of blending into the natural environment in which the firearm will be used are preferable. The design may be painted, integrally cast into the sheet, printed or provided to the sheet in any known manner.

In the preferred embodiment, conventional printing processes are utilized in transferring a photographic image of one or more objects present in a selected environment onto the sheets 52, 56, 60 and 64. Such objects may include: rocks, soils, tree branches tree bark and leaves. If desired, the image of one or more game animals, in whole or part, may be combined with a background of leaves, for instance, to provide a visually striking camouflage design. Of course, a generic camouflage pattern such as the one illustrated in the figures may also be utilized.

One commercially available product suitable in forming the portions 42–50 is marketed by FLEXcon Company, Inc., of Spencer, Mass. under the tradename "CONFORMcal". CONFORMcal model no. V-400 FSw V-29 90 PFW, for example, is a flexible vinyl film 3.5 mil thick coated with a pressure-sensitive, acrylic adhesive backing approximately 1.0 mil thick and backed with a release liner. The vinyl film itself is relatively soft and easily stretched to conform to the contours of irregular surfaces like those of the gun stock 12 and barrel 14. The vinyl film can also receive a printed camouflage design and can be thermal kiss cut into practically any shape.

Securing the portions 42–50 to the rifle 10 may be accomplished in a matter of minutes. As illustrated in FIG. 3, a corner of lateral portion 42 is first chosen and ruffled between the index finger and thumb, causing separation of the adhesive backing 54 from the protective release liner 68 comprised of a relatively thin plastic film, for example. When about one-half of an inch, or any other manageable portion, of release liner 68 has been peeled away from the portion 42 along its entire width, the exposed adhesive backing 54 of portion 42 is fastened onto gun stock 12 along the exposed margin of the portion 42.

The portion 42 is next anchored with one hand while the other is used to slowly and evenly pull away the release liner 68 causing more of the adhesive backing 54 to be exposed and to adhere the portion 42 to stock 12. The relatively smooth texture of the stock 12 coupled with the coextensive, uniform depth adhesive backing 54 facilitates an even adherence of the portion 42 to the stock 12 and aids in preventing the formation of wrinkles in the portion 42 and entrapment of air bubbles.

The preferred, light-tack adhesive 54 permits the portion 42 to be repositioned as needed to achieve coverage of approximately one-half of the gun stock 12. Covering the remainder of the rifle 10 may be easily accomplished by repeating the steps outlined above for each of the portions 44–50. The associated release liners need only be removed from the portions and then the exposed adhesive backings applied to selected portions of the firearm to retain the flexible sheets in place. Should any sheet not perfectly conform to the contours of the firearm, hot air from a heat gun may be applied to the sheet where needed to further increase its flexibility.

Since the portions 42–50 are only lightly attached to the stock 12, removing such after use is readily accomplished. The removal process commences by scraping a small portion of the corner of portions 42–50, now perhaps being scratched and torn by contact with tree limbs, grit-bearing foliage and stiff underbrush, off the stock 12 with a fingernail or a knife edge. Once done, the scraped portions may then be worked into a firm grip between the index finger and the thumb, the gripping action being facilitated by the presence of the light tack adhesive on one side of the portions 42–50. Finally, the individual portions 42–50 may be easily pulled from the stock 12 and barrel 14 and discarded or stored for later use.

While the present invention was described with reference to a long-barreled firearm, the principals thereof, particularly the concept of conveniently providing an article of manufacture with a protective, camouflaged cover is applicable to a variety of technologies. Accordingly, the concealing material of the present invention may be employed anywhere a camouflaged surface is required. For example, an archery bow could be covered by such a material. Other applications include ice chests and hunting blinds.

While the invention has also been described with a high degree of particularity, it will be appreciated by those skilled in the art that numerous modifications and substitutions may be made thereto. For example, the outline of the various sheets themselves may be varied as needed to suit the dimensions of the article to which it is to be applied. These varying shapes may each be formed at the time of manufacture or, alternatively, indicia may be provided on the release liner which serve as a guide to the user in cutting a larger sheet of material to a smaller size. Therefore, it is to be understood that the present invention is not limited to the embodiments described above, but encompasses any and all embodiments within the scope of the following claims.

We claim:

1. A protective cover for a long-barreled firearm having a stock with opposed, first and second sides, comprising:

a first flexible sheet of substantially uniform thickness having one surface bearing a camouflage pattern and an undersurface opposed therefrom, said first flexible sheet further having a shape corresponding to that of the first side of the stock and having a first pair of opposed longitudinal edges for positioning, respectively, adjacent the top and bottom of the stock; and, a backing of light-tack, adhesive material applied to the undersurface of said first flexible sheet.

2. The protective cover according to claim 1 further comprising:

a second flexible sheet of substantially uniform thickness having one surface bearing a camouflage pattern and an undersurface opposed therefrom, said second flexible sheet further having a shape corresponding to that of the second side of the stock and having a second pair of opposed longitudinal edges for positioning, respectively, adjacent the top and bottom of the stock; and, a backing of light-tack, adhesive material applied to the undersurface of said second flexible sheet.

3. The protective cover according to claim 2 wherein said first and second pairs of opposed longitudinal edges are dimensioned to overlap one another at the top and bottom of the stock to provide a water-resistant seal.

4. The protective cover according to claim 2 further comprising:

a butt plate portion having a third flexible sheet of substantially uniform thickness with a shape corresponding to that of one end of the stock and having a pair of opposed lateral edges for positioning, respectively, adjacent the opposed sides of the stock; and, a backing of light-tack, adhesive material applied to the undersurface of said third flexible sheet.

5. The protective cover according to claim 2 further comprising:

a barrel portion having a fourth flexible sheet of substantially uniform thickness having an elongated rectangular shape corresponding to that of the barrel of the firearm; and, a backing of light-tack, adhesive material applied to the undersurface of said fourth flexible sheet.

6. The protective cover according to claim 2, wherein the firearm stock includes a pistol grip, further comprising:

a grip cap portion having a fifth flexible sheet of substantially uniform thickness with a shape corresponding to that of the bottom of the pistol grip and having a pair of opposed lateral edges for positioning, respectively, adjacent the opposed sides of the stock; and, a backing of light-tack, adhesive material applied to the undersurface of said fifth flexible sheet.

7. The protective cover according to claim 1 further comprising at least one release liner affixed to and coextensive with said adhesive material backing, each said liner sandwiching said adhesive material backing between said flexible sheet and said release liner whereby, in use, each said release liner may be peeled from said adhesive material backing as said flexible sheet is attached to the stock, said adhesive material backing being of sufficient weakness so as to permit repositioning of said flexible sheet and of sufficient strength so as to retain said flexible sheet during use, whereupon, after use, said flexible sheet may be peeled from the article and discarded.

8. The protective cover according to claim 1 wherein said first flexible sheet are formed of an impermeable material.

9. The protective cover according to claim 8 wherein said impermeable material is vinyl.

10. The protective cover according to claim 9 wherein said first flexible sheet has a thickness between 0.5 mil and 6 mil.

11. A protective cover for a long-barreled firearm having a stock with a pistol grip, a butt end and opposed, first and second sides, said protective cover comprising:

a first flexible sheet of substantially uniform thickness having one surface bearing a camouflage pattern and an undersurface opposed therefrom, said first flexible sheet further having a shape corresponding to that of the first side of the stock and having a first pair of opposed longitudinal edges for positioning, respectively, adjacent the top and bottom of the stock;

a second flexible sheet of substantially uniform thickness having one surface bearing a camouflage pattern and an undersurface opposed therefrom, said second flexible sheet further having a shape corresponding to that of the second side of the stock and having a second pair of opposed longitudinal edges for positioning, respectively, adjacent the top and bottom of the stock;

said first and second pairs of opposed longitudinal edges being dimensioned to overlap one another at the top and bottom of the stock to provide a water-resistant seal;

a third flexible sheet of substantially uniform thickness having one surface bearing a camouflage pattern and an undersurface opposed therefrom, said third flexible sheet further having a shape corresponding to that of the butt end of the stock and having a pair of opposed lateral edges for positioning, respectively, adjacent the opposed sides of the stock;

a fourth flexible sheet of substantially uniform thickness having one surface bearing a camouflage pattern and an undersurface opposed therefrom, said fourth flexible sheet further having an elongated rectangular shape corresponding to that of the barrel of the firearm;

a fifth flexible sheet of substantially uniform thickness having one surface bearing a camouflage pattern and an undersurface opposed therefrom a shape corresponding to that of the bottom of the pistol grip and having a pair of opposed lateral edges for positioning, respectively, adjacent the opposed sides of the stock;

said first, second, third, fourth and fifth flexible sheets being respectively formed from an impermeable material;

a backing of light-tack, adhesive material applied to the respective undersurfaces of said first, second, third, fourth and fifth flexible sheets, said adhesive material backing being of sufficient weakness so as to permit repositioning of said first, second, third, fourth and fifth flexible sheets and of sufficient strength so as to retain said first, second, third, fourth and fifth flexible sheets during use, whereupon, after use, said first, second, third, fourth, and fifth flexible sheets may be peeled from the firearm and discarded; and, a plurality of release liners each being affixed to and coextensive with said adhesive material backing on the respective undersurfaces of said first, second, third, fourth and fifth flexible sheets.

* * * * *